United States Patent [19]
Daniels

[11] Patent Number: 6,029,483
[45] Date of Patent: Feb. 29, 2000

[54] ANTI-THEFT DEVICE FOR AUTOMOBILES

[76] Inventor: Darryl Edward Daniels, 11355 E. Ave. R-8, Littlerock, Calif. 93543

[21] Appl. No.: 09/282,253

[22] Filed: Mar. 31, 1999

[51] Int. Cl.⁷ ................................................... B60R 25/02
[52] U.S. Cl. ............................... 70/199; 70/202; 70/211; 70/238
[58] Field of Search ............................. 70/209, 211, 212, 70/198–203, 237, 238, 254

[56] References Cited

U.S. PATENT DOCUMENTS

| | | | |
|---|---|---|---|
| 2,716,336 | 8/1955 | Ross | 70/238 |
| 4,903,510 | 2/1990 | Surles | 70/202 |
| 5,040,387 | 8/1991 | Knott, Jr. | 70/254 X |
| 5,267,458 | 12/1993 | Heh | 70/238 |
| 5,586,457 | 12/1996 | Keener | 70/237 X |
| 5,704,233 | 1/1998 | Farshad | 70/238 |
| 5,881,587 | 3/1999 | Vito | 70/237 X |
| 5,906,121 | 5/1999 | Mankarious | 70/202 X |
| 5,950,463 | 9/1999 | Glazier et al. | 70/237 X |

*Primary Examiner*—Lloyd A. Gall
*Attorney, Agent, or Firm*—Goldstein & Canino

[57] ABSTRACT

An anti-theft device for automobiles including an elongated tubular shaft having a length consistent with a distance between a steering wheel and accelerator pedal of a motor vehicle. A receiving collar is securable within an opening formed within a floor board of the motor vehicle disposed adjacent to the accelerator pedal. The receiving collar has an open outer end for receiving the lower end of the shaft therein in an operative orientation. A pedal plate is secured to the shaft upwardly of the lower end thereof and is positionable beneath the accelerator pedal in the operative orientation. A locking mechanism is secured to the upper end of the shaft for engaging the steering wheel.

6 Claims, 2 Drawing Sheets

ANTI-THEFT DEVICE FOR AUTOMOBILES

BACKGROUND OF THE INVENTION

The present invention relates to an anti-theft device for automobiles and more particularly pertains to simultaneously blocking usage of both a steering wheel and accelerator pedal.

Most anti-theft devices are secured to a steering wheel whereby a would-be-theft would be thwarted in their attempt at stealing the vehicle only momentarily. The thief could simply cut through these devices to facilitate removal of the device. Additionally, these devices do not impede the thief's ability to gain access to the accelerator or the brake pedals. Alternate devices have been disclosed which provide a mechanical interlock between the vehicle steering wheel and the vehicle foot brake pedal. These devices prevent the brake pedal from being depressed. However, there has not been a device that is secured between the steering wheel and the accelerator pedal.

The present invention seeks to provide an anti-theft device which utilizes both the steering wheel and the accelerator pedal to prevent the theft of a motor vehicle.

The use of vehicle anti-theft devices is known in the prior art. More specifically, vehicle anti-theft devices heretofore devised and utilized for the purpose of preventing theft of an automobile are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,653,133 to Passantino discloses an anti-theft device capable of locking the steering wheel and the brake of a vehicle with an elongated steel member with incorporated hooks and secured by a pair of padlocks. U.S. Pat. No. 4,432,432 to Martin discloses the use of a bumper jack to secure the brake pedal and steering wheel of an automotive vehicle. U.S. Pat. No. 4,696,172 to Farrow discloses an extendible yoke used as part of an anti-theft system for locking a vehicle's steering wheel to a brake pedal. U.S. Pat. No. Des. 365,269 to Valles discloses an ornamental anti-theft device.

While these devices fulfill their respective, particular objective and requirements, the aforementioned patents do not describe an anti-theft device for automobiles for simultaneously blocking usage of both a steering wheel and accelerator pedal.

In this respect, the anti-theft device for automobiles according to the present invention substantially departs from the conventional concepts and designs of the prior art, and in doing so provides an apparatus primarily developed for the purpose of simultaneously blocking usage of both a steering wheel and accelerator pedal.

Therefore, it can be appreciated that there exists a continuing need for new and improved anti-theft device for automobiles which can be used for simultaneously blocking usage of both a steering wheel and accelerator pedal. In this regard, the present invention substantially fulfills this need.

SUMMARY OF THE INVENTION

In the view of the foregoing disadvantages inherent in the known types of vehicle anti-theft devices now present in the prior art, the present invention provides an improved anti-theft device for automobiles. As such, the general purpose of the present invention, which will be described subsequently in greater detail, is to provide a new and improved anti-theft device for automobiles and method which has all the advantages of the prior art and none of the disadvantages.

To attain this, the present invention essentially comprises an elongated tubular shaft having a length consistent with a distance between a steering wheel and accelerator pedal of a motor vehicle. The shaft has an upper end and a lower end. The lower end has gripping teeth disposed thereon. A receiving collar is securable within an opening formed within a floor board of the motor vehicle disposed adjacent to the accelerator pedal. The receiving collar has an open outer end for receiving the lower end of the shaft therein in an operative orientation. A pedal plate is secured to the shaft upwardly of the lower end thereof. The pedal plate has a generally L-shaped configuration defined by a horizontal plate and a vertical plate. The horizontal plate has a notch formed within a side edge thereof. The horizontal plate is positionable beneath the accelerator pedal in the operative orientation whereby the notch fits around a post of the accelerator pedal. A locking mechanism is secured to the upper end of the shaft. The locking mechanism includes a housing secured to the upper end of the shaft. The housing has an opening therethrough offset from the shaft. The locking mechanism includes an inverted J-shaped member having a linear portion and an arcuate portion. The linear portion has notches formed thereon along a length thereof. The linear portion is received within the opening through the housing for being engaged by a locking member disposed within the housing whereby the arcuate portion engages the steering wheel. The locking mechanism includes a key to facilitate locking and unlocking of the locking member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved anti-theft device for automobiles which has all the advantages of the prior art vehicle anti-theft devices and none of the disadvantages.

It is another object of the present invention to provide a new and improved anti-theft device for automobiles which may be easily and efficiently manufactured and marketed.

It is a further object of the present invention to provide a new and improved anti-theft device for automobiles which is of durable and reliable construction.

An even further object of the present invention is to provide a new and improved anti-theft device for automobiles which is susceptible of a low cost of manufacture with regard to both materials and labor, and which accordingly is then susceptible of low prices of sale to the consuming public, thereby making such an anti-theft device for automobiles economically available to the buying public.

Even still another object of the present invention is to provide a new and improved anti-theft device for automobiles for simultaneously blocking usage of both a steering wheel and accelerator pedal.

Lastly, it is an object of the present invention to provide a new and improved anti-theft device for automobiles including an elongated tubular shaft having a length consistent with a distance between a steering wheel and accelerator pedal of a motor vehicle. A receiving collar is securable within an opening formed within a floor board of the motor vehicle disposed adjacent to the accelerator pedal. The receiving collar has an open outer end for receiving the lower end of the shaft therein in an operative orientation. A pedal plate is secured to the shaft upwardly of the lower end thereof and is positionable beneath the accelerator pedal in the operative orientation. A locking mechanism is secured to the upper end of the shaft for engaging the steering wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
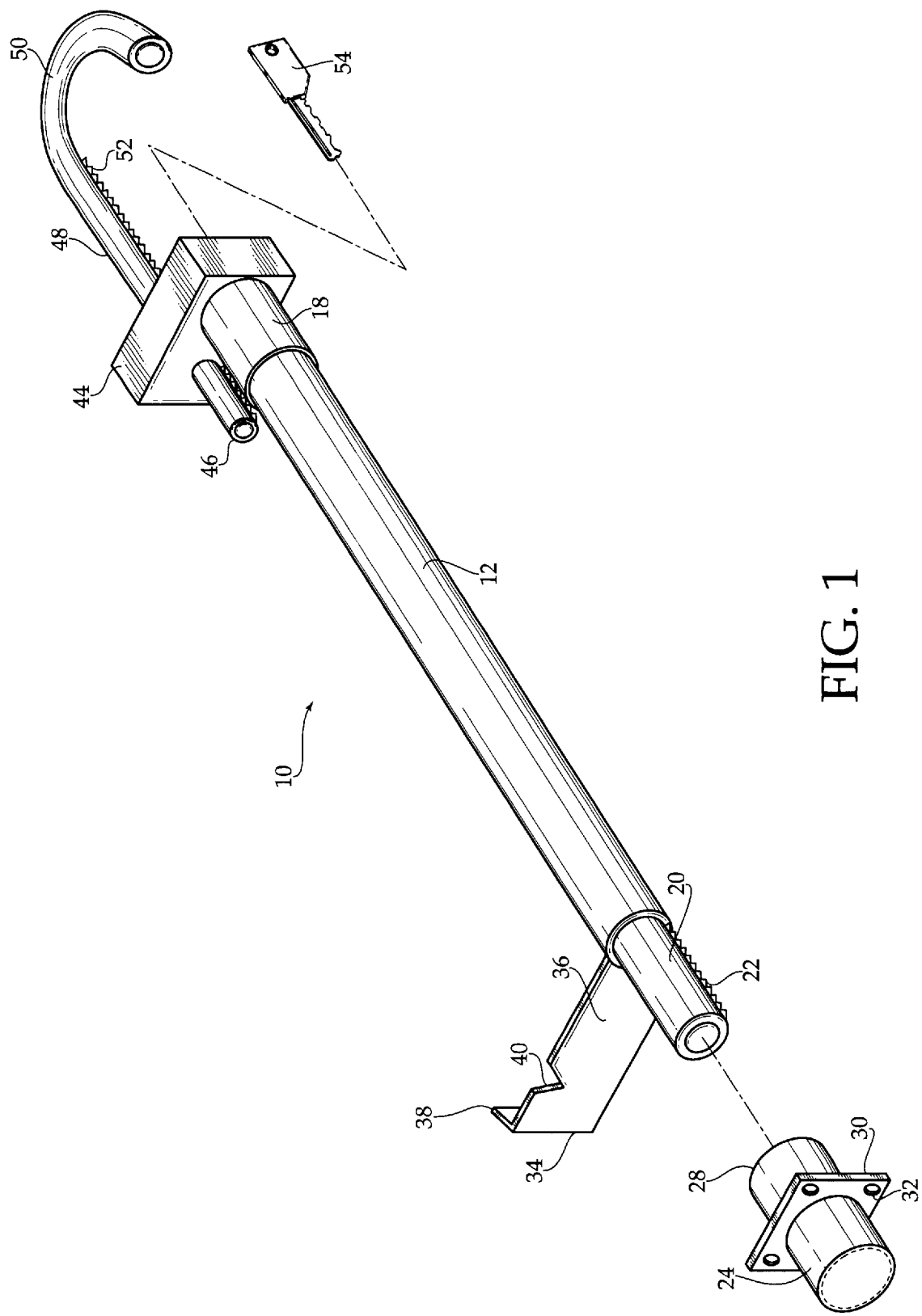
FIG. 1 is a perspective view of the preferred embodiment of the anti-theft device for automobiles constructed in accordance with the principles of the present invention.
Figure 2:
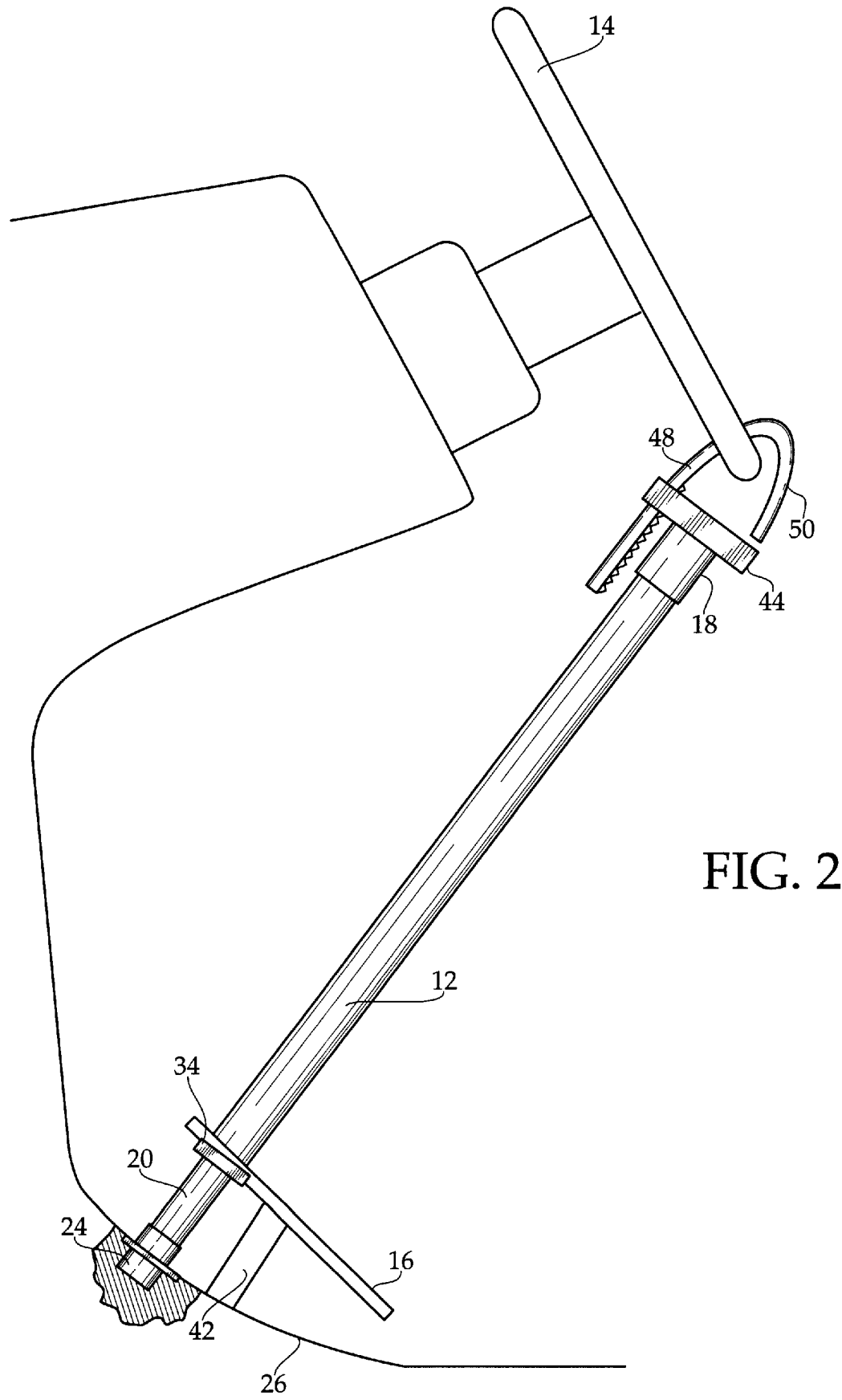
FIG. 2 is a side view of the present invention illustrated in use.

With reference now to the drawings, and in particular, to FIGS. 1 and 2 thereof, the preferred embodiment of the new and improved anti-theft device for automobiles embodying the principles and concepts of the present invention and generally designated by the reference number 10 will be described.

Specifically, it will be noted in the various Figures that the device relates to a anti-theft device for automobiles for simultaneously blocking usage of both a steering wheel and accelerator pedal. In its broadest context, the device consists of an elongated tubular shaft, a receiving collar, a pedal plate, and a locking mechanism. Such components are individually configured and correlated with respect to each other so as to attain the desired objective.

The elongated tubular shaft 12 has a length consistent with a distance between a steering wheel 14 and accelerator pedal 16 of a motor vehicle. The shaft 12 has an upper end 18 and a lower end 20. The lower end 20 has gripping teeth 22 disposed thereon. The shaft 12 is preferably constructed of steel or other strong metal to prevent a thief from sawing through a center thereof to facilitate removal and subsequent theft of the motor vehicle.

The receiving collar 24 is securable within an opening formed within a floor board 26 of the motor vehicle disposed adjacent to the accelerator pedal 16. The receiving collar 24 has an open outer end 28 for receiving the lower end 20 of the shaft 12 therein in an operative orientation. The receiving collar 24 is provided with a mounting tab 30 disposed therearound having a plurality of screw holes 32 therethrough for receiving screws to secure the receiving collar 24 to the floor board.

The pedal plate 34 is secured to the shaft 12 upwardly of the lower end 20 thereof. The pedal plate 34 has a generally L-shaped configuration defined by a horizontal plate 36 and a vertical plate 38. The horizontal plate 36 has a notch 40 formed within a side edge thereof. The horizontal plate 36 is positionable beneath the accelerator pedal 16 in the operative orientation whereby the notch 40 fits around a post 42 of the accelerator pedal 16. The positioning of the pedal plate 34, as such, in the operative orientation, prevents the depressing of the accelerator pedal 16. Note FIG. 2.

The locking mechanism is secured to the upper end 18 of the shaft 12. The locking mechanism includes a housing 44 secured to the upper end 18 of the shaft 12. The housing 44 has an opening therethrough offset from the shaft 12. The locking mechanism includes an inverted J-shaped member 46 having a linear portion 48 and an arcuate portion 50. The linear portion 48 has notches 52 formed thereon along a length thereof. The linear portion 48 is received within the opening through the housing 44 for being engaged by a locking member disposed within the housing 44 whereby the arcuate portion 50 engages the steering wheel 14. The locking mechanism includes a key 54 to facilitate locking and unlocking of the locking member.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An anti-theft device for automobiles for simultaneously blocking usage of both a steering wheel and accelerator pedal comprising, in combination:

an elongated tubular shaft having a length consistent with a distance between a steering wheel and accelerator pedal of a motor vehicle, the shaft having an upper end and a lower end, the lower end having gripping teeth disposed thereon;

a receiving collar securable within an opening formed within a floor board of the motor vehicle and adapted to be disposed adjacent to the accelerator pedal, the receiving collar having an open outer end for receiving the lower end of the shaft therein in an operative orientation;

a pedal plate secured to the shaft upwardly of the lower end thereof, the pedal plate having a generally L-shaped configuration defined by a horizontal plate and a vertical plate, the horizontal plate having a notch formed within a side edge thereof, the horizontal plate being positionable beneath the accelerator pedal in the operative orientation whereby the notch fits around a post of the accelerator pedal;

a locking mechanism secured to the upper end of the shaft, the locking mechanism including a housing secured to the upper end of the shaft, the housing having an opening therethrough offset from the shaft, the locking mechanism including an inverted J-shaped member having a linear portion and an arcuate portion, the linear portion having notches formed thereon along a length thereof, the linear portion being received within the opening through the housing for being engaged by a locking member disposed within the housing whereby the arcuate portion is adapted to engage the steering wheel, the locking mechanism including a key to facilitate locking and unlocking of the locking member.

2. An anti-theft device for automobiles for simultaneously blocking usage of both a steering wheel and accelerator pedal comprising, in combination:

an elongated tubular shaft having a length consistent with a distance between a steering wheel and accelerator pedal of a motor vehicle;

a receiving collar securable within an opening formed within a floor board of the motor vehicle and adapted to be disposed adjacent to the accelerator pedal, the receiving collar having an open outer end for receiving a lower end of the shaft therein in an operative orientation;

a pedal plate secured to the shaft upwardly of the lower end thereof, the plate being positionable beneath the accelerator pedal in the operative orientation;

a locking mechanism secured to the upper end of the shaft for engaging the steering wheel.

3. The anti-theft device for automobiles as set forth in claim 2 wherein the lower end of the shaft has gripping teeth disposed thereon.

4. The anti-theft device for automobiles as set forth in claim 2 wherein the pedal plate has a generally L-shaped configuration defined by a horizontal plate and a vertical plate, the horizontal plate having a notch formed within a side edge thereof whereby the notch fits around a post of the accelerator pedal in the operative orientation.

5. The anti-theft device for automobiles as set forth in claim 2 wherein the locking mechanism includes a housing secured to the upper end of the shaft, the housing having an opening therethrough offset from the shaft, the locking mechanism including an inverted J-shaped member having a linear portion and an arcuate portion, the linear portion having notches formed thereon along a length thereof, the linear portion being received within the opening through the housing for being engaged by a locking member disposed within the housing whereby the arcuate portion is adapted to engage the steering wheel.

6. The anti-theft device for automobiles as set forth in claim 5 wherein the locking mechanism includes a key to facilitate locking and unlocking of the locking member.

* * * * *